(12) United States Patent
Abiko et al.

(10) Patent No.: US 11,667,333 B2
(45) Date of Patent: Jun. 6, 2023

(54) VEHICLE BODY FRONT STRUCTURE

(71) Applicant: HONDA MOTOR CO., LTD., Tokyo (JP)

(72) Inventors: Masahiro Abiko, Tokyo (JP); Ryo Kita, Tokyo (JP); Yuta Deguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 17/471,492

(22) Filed: Sep. 10, 2021

(65) Prior Publication Data

US 2022/0081036 A1 Mar. 17, 2022

(30) Foreign Application Priority Data

Sep. 11, 2020 (JP) .............................. JP2020-152544

(51) Int. Cl.
| | |
|---|---|
| *B62D 21/15* | (2006.01) |
| *B62D 25/08* | (2006.01) |
| *B62D 25/20* | (2006.01) |
| *B60R 19/34* | (2006.01) |

(52) U.S. Cl.
CPC ............ *B62D 21/152* (2013.01); *B60R 19/34* (2013.01); *B62D 25/085* (2013.01); *B62D 25/088* (2013.01); *B62D 21/15* (2013.01); *B62D 25/08* (2013.01); *B62D 25/082* (2013.01); *B62D 25/20* (2013.01); *B62D 25/2018* (2013.01)

(58) Field of Classification Search
CPC ........ B62D 21/00; B62D 21/02; B62D 21/15; B62D 21/152; B62D 25/08; B62D 25/082; B62D 25/085; B62D 25/088; B62D 25/20; B62D 25/2009; B62D 25/2018

USPC .... 296/133, 193.09, 203.01, 203.02, 203.09, 296/205; 188/376
See application file for complete search history.

(56) References Cited

U.S. PATENT DOCUMENTS

| | | | | |
|---|---|---|---|---|
| 5,372,216 | A  * | 12/1994 | Tsuji ...................... | B60G 99/00 180/274 |
| 10,807,644 | B2 | 10/2020 | Kondo et al. | |
| 2017/0088179 | A1* | 3/2017 | Takeda .................. | B62D 21/15 |
| 2019/0276094 | A1* | 9/2019 | Kondo ................... | B62D 25/08 |

FOREIGN PATENT DOCUMENTS

JP            6541722 B2    7/2019

* cited by examiner

*Primary Examiner* — Dennis H Pedder
*Assistant Examiner* — Joyce Eileen Hill
(74) *Attorney, Agent, or Firm* — Rankin, Hill & Clark LLP

(57) ABSTRACT

A vehicle body front structure includes: a front side frame extending in a longitudinal direction of a vehicle body; a side frame disposed laterally outside the front side frame in a vehicle width direction and extending in the longitudinal direction of the vehicle body; and a damper housing disposed laterally inside the side frame in the vehicle width direction. The side frame extends obliquely in a frontward and downward direction from a bent portion formed in proximity to the damper housing, and has a rectangular cross-section formed by a U-shaped member having a generally U-shaped cross-section and a lid member disposed on an open side of the U-shaped member. A first bendable portion is formed at a front end portion of the side frame by setting a strength of the lid member lower than a strength of the U-shaped member.

12 Claims, 17 Drawing Sheets

VEHICLE BODY FRONT STRUCTURE

CROSS-REFERENCE TO RELATED APPLICATION

This application claims the benefit of foreign priority to Japanese Patent Application No. 2020-152544, filed on Sep. 11, 2020, which is incorporated by reference in its entirety.

TECHNICAL FIELD

The present invention relates to a vehicle body front structure for an automobile and the like.

BACKGROUND ART

A vehicle body front structure includes a front side frame disposed on each sides of the front side of a vehicle body, and a side frame disposed above and laterally outside the front side frame in the vehicle width direction and extending in the longitudinal direction of the vehicle body. The side frame includes an upper member extending in the horizontal direction, a lower member connected to the front end of the upper member and extending while curving in a frontward and downward direction, and a bent portion provided in proximity to a connecting portion of the lower member at which the upper member is connected to the lower member. Further, the vehicle body front structure includes a reinforcement member disposed inside the side frame. The reinforcement member extends frontward from the upper member to the lower member across the bent portion, and has a fragile portion at a front side of the bent portion of the side frame. See, for example, Japanese Patent No. 6541722.

When such a vehicle body front structure receives an impact, for example, in a frontal collision with an object from the front side of the vehicle body, the bent portion located at the boundary portion between the upper member and the lower member bends to absorb the impact energy.

In recent years, the number of electric vehicles has been increasing in accordance with environmental measures, and due to changes in energy supply sources of the vehicles, the weight of electric vehicle has been increasing because of the installation of a large-sized battery or an energy storage device. For this reason, an impact energy in a collision of the vehicle has been increasing. Since the vehicle body front structure disclosed in JP 6541722 B allows only the bent portion located at the boundary portion between the upper member and the lower member to bend (deform), the amount of impact energy absorbed by the vehicle body front structure is disadvantageously small.

In view of the above, it is an object of the present invention to provide a vehicle body front structure capable of increasing the amount of impact energy absorption to the vehicle body by means of the bent portion of the side frame and another bendable portion located frontward of the bent portion.

SUMMARY

The present invention proposed to attain the above object provides a vehicle body front structure comprising: a front side frame extending in a longitudinal direction of a vehicle body; a side frame disposed laterally outside the front side frame in a vehicle width direction and extending in the longitudinal direction of the vehicle body; and a damper housing disposed laterally inside the side frame in the vehicle width direction, wherein the side frame extends obliquely in a frontward and downward direction from a bent portion formed in proximity to the damper housing, and has a rectangular cross-section formed by a U-shaped member having a generally U-shaped cross-section and a lid member disposed on an open side of the U-shaped member, and wherein a first bendable portion is formed at a front end portion of the side frame by setting a strength of the lid member lower than a strength of the U-shaped member.

BRIEF DESCRIPTION OF THE DRAWINGS

The drawings described herein are for illustration purposes only and are not intended to limit the scope of the present invention in any way.

DETAILED DESCRIPTION OF THE INVENTION

<Configuration of Vehicle Body Front Structure>

Figure 1:
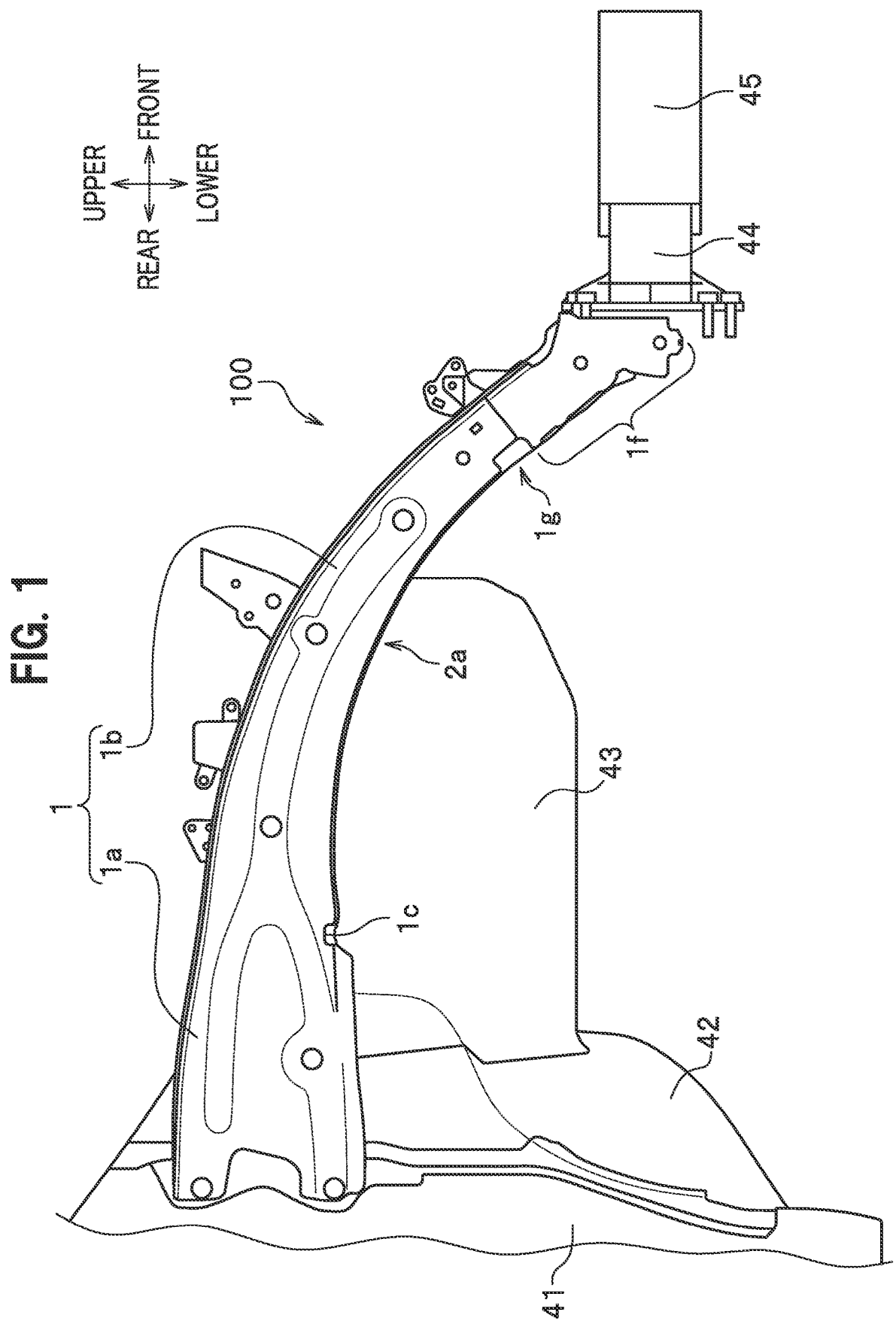
FIG. 1 is a perspective view of a vehicle body front structure according to one embodiment of the present invention.

One embodiment of the present invention will be described in detail with reference to FIG. 1 to FIG. 21. In the description, the same elements are denoted by the same reference numerals and redundant explanation thereof will be omitted. In the drawings, front and rear directions shown by arrows refer to corresponding front and rear directions in the longitudinal direction (i.e., front-rear direction) of an automobile (vehicle or vehicle body (not shown)), inner and outer directions shown by arrows refer to corresponding inner and outer directions in the vehicle width direction (i.e., lateral direction or right-left direction) of the automobile, and upper and lower directions refer to corresponding upper and lower directions in the vertical direction (i.e., upper-lower direction) of the automobile.

FIG. 1 is a perspective view of a vehicle body front structure according to one embodiment of the present invention.

In a vehicle body front structure 100 shown in FIG. 1, a side frame 1 includes a horizontal extension portion 1a disposed above a front wheel of the vehicle body and extending substantially horizontally in the longitudinal direction of the vehicle body, and a front downwardly inclined portion 1b extending obliquely in a frontward and downward direction from the horizontal extension portion 1a. The horizontal extension portion 1a is a wheel house upper member, and the front downwardly inclined portion 1b is a wheel house lower member.

Figure 2:
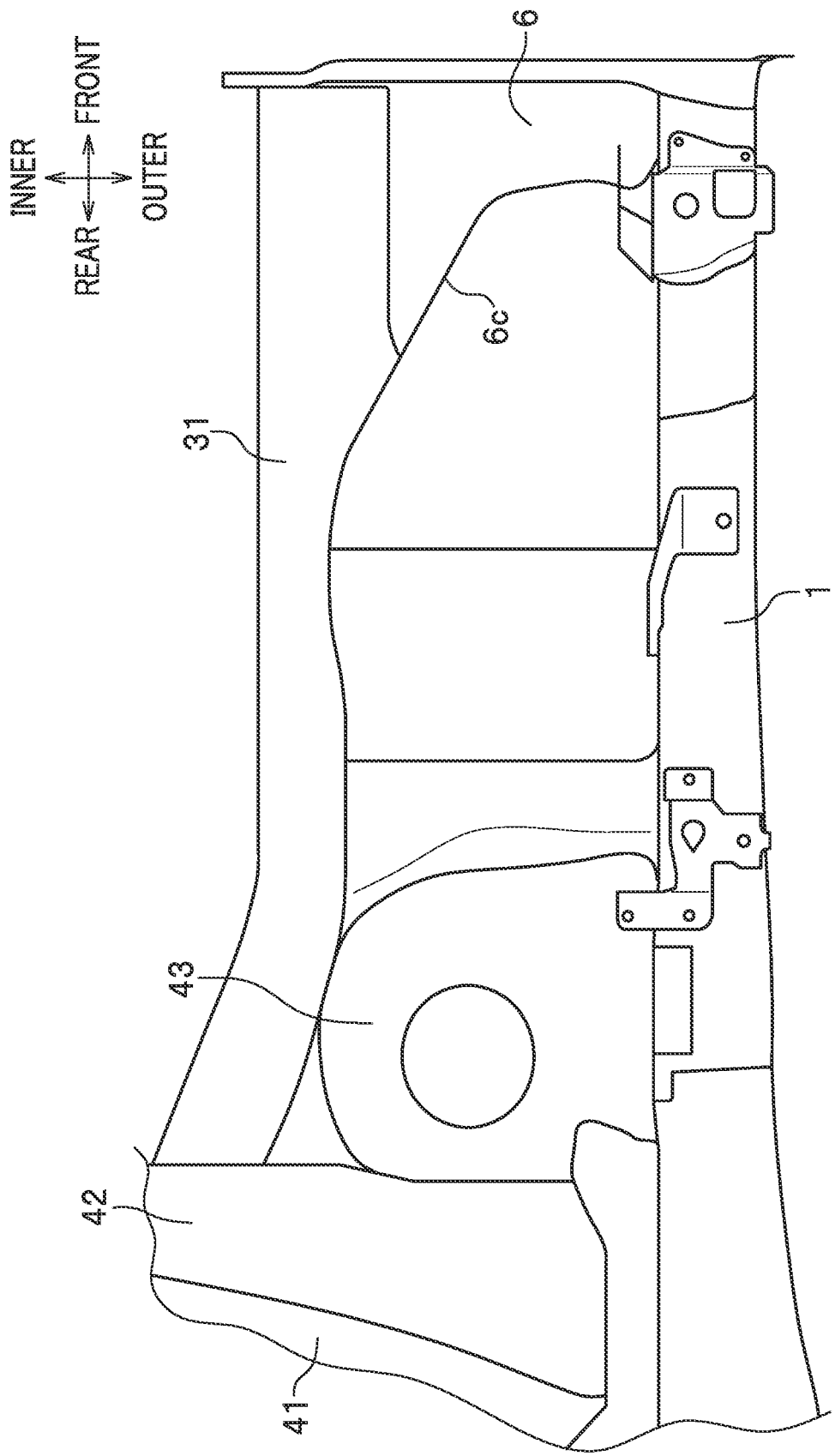
FIG. 2 is a plan view showing a configuration of the vehicle body front structure, in which a front end portion of a side frame and a front end portion of a front side frame are connected by a lateral frame.

As seen in FIG. 2, the side frame 1 is disposed laterally outside a front side frame 31 in the vehicle width direction. The front side frame 31 is disposed on a front side of the vehicle body and extends substantially horizontally in the longitudinal direction of the vehicle body. The side frame 1 and the front side frame 31 are arranged in a pair on the right side and the left side in the vehicle width direction. Although the side frame 1 disposed on the right side of the vehicle body will be described below, the side frame 1 disposed on the right side and the side frame 1 disposed on the left side have the same configuration except that they are arranged symmetrically in the right-left direction.

Referring back to FIG. 1, a rear end side of the side frame 1 is connected to a front pillar 41 provided to extend in the vertical direction. A dashboard lower 42 is connected to a longitudinal front end of the front pillar 41 in the longitudinal direction of the vehicle body. The dashboard lower 42 is disposed laterally inside the side frame 1 in the vehicle width direction and provided to extend in the vertical direction. A front end side of the dashboard lower 42 is connected to a damper housing 43. Further, a front end of the side frame 1 is connected to a bumper beam 45 through a crash box 44.

Figure 4:
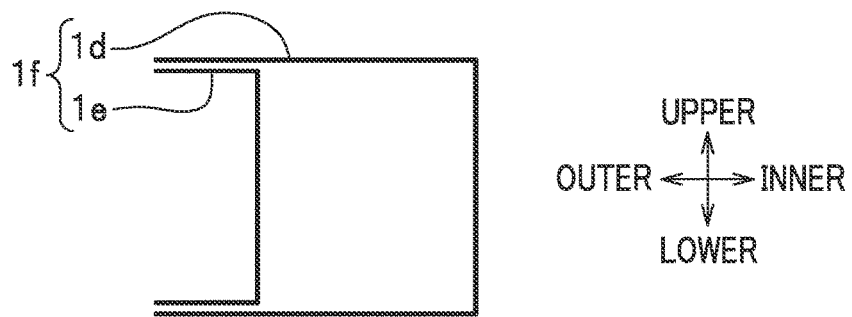
FIG. 4 is a sectional view taken along the line IV-IV of FIG. 3.

The side frame 1 includes a bent portion 1c located near the boundary between the horizontal extension portion 1a and the front downwardly inclined portion 1b. Further, as seen in FIG. 4, the side frame 1 includes a U-shaped member 1d having a U-shaped cross-section, and a lid member 1e fitted to an open side of the U-shaped member 1d. The side frame 1 has a rectangular cross-section formed by the U-shaped member 1d and the lid member 1e. As seen in FIG. 4, the lid member 1e has a U-shaped cross-section with a shallow bottom. The U-shaped member 1d opens toward the outside in the vehicle width direction.

Figure 3:
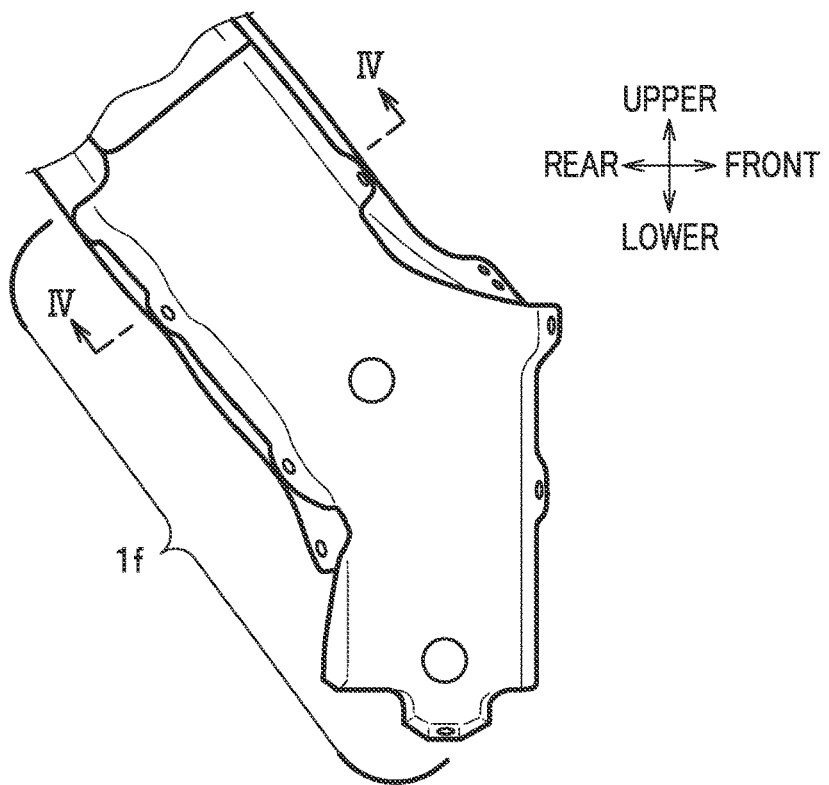
FIG. 3 is a side view showing a first bendable portion that is a front end portion of the side frame.

As seen in FIG. 1, a front end portion of the side frame 1 forms a first bendable portion 1f having a predetermined length and extending obliquely in the longitudinal direction of the vehicle body. An enlarged view of the first bendable portion 1f is shown in FIG. 3, and a cross-sectional configuration taken along the line IV-IV of FIG. 3 is shown in FIG. 4. The lid member 1e is designed to have a strength lower than that of the U-shaped member 1d. For example, the lid member 1e is made of a material having a strength lower than that of the U-shaped member 1d (material having a lower tensile strength). The reason why the lid member 1e is fitted into an opening of the U-shaped member 1d like a lid is that it can transmit a collision load received in a frontal collision to the rear side of the vehicle body and that it can serve as a support member for preventing vibration of the U-shaped member 1d during traveling of the vehicle.

Figure 5:
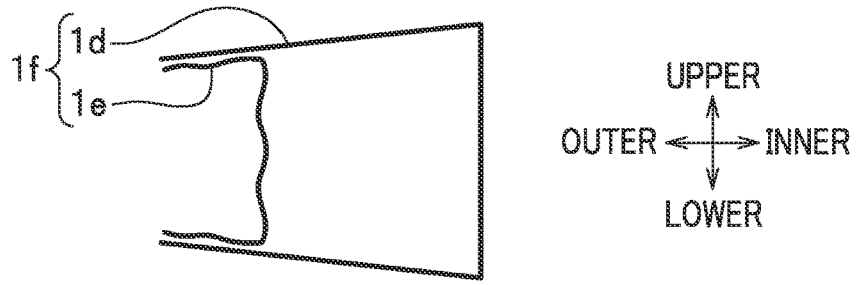
FIG. 5 is a sectional view illustrating a U-shaped member in the configuration of FIG. 4 when the U-shaped member collapses in the vertical direction due to buckling of a lid member.

In this side frame 1 configured as described above and shown in FIG. 1, when the bumper beam 45 collides (head on) with an impacting object 50 (see FIG. 6) such as a car in front and a solid object, a collision load acts on the first bendable portion 1f. In other words, as seen in FIG. 5, the lid member 1e having a lower strength buckles when the load acts on the rectangular cross-section of the first bendable portion 1f, and upper and lower sides of the U-shaped member 1d collapse to approach each other by this buckling, so that the rectangular cross-section collapses accordingly. As seen in FIG. 1, this collapse causes the first bendable portion 1f to undergo a bending deformation prior to bending deformations of a first notch 1g, a second notch 2a, and the bent portion 1c that are disposed rearward in the longitudinal direction of the vehicle (simply referred to rear side or rearward) of the first bendable portion 1f. By this bending deformation the first bendable portion 1f bends over and buckles at the boundary with portions rearward of the first bendable portion 1f (in a position indicated by opposite arrows Y1 in FIG. 6).

Figure 7:
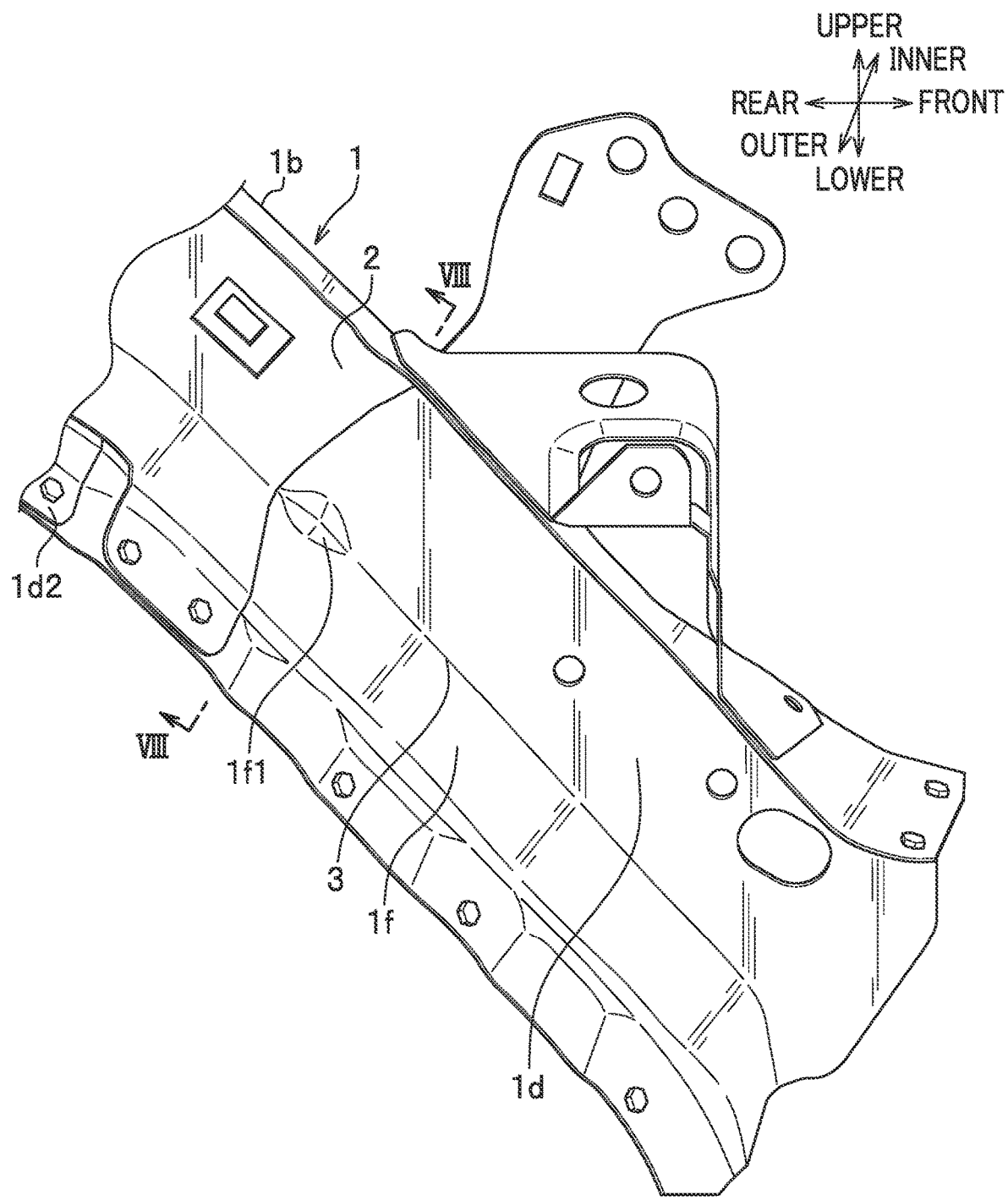
FIG. 7 is a side view showing a recess portion serving as a second bendable portion of the side frame.

FIG. 7 shows an inner configuration (inner side), with the lid member 1e of the side frame 1 (see FIG. 4) being removed, of the first bendable portion 1f and the front downwardly inclined portion 1b disposed rearward of the first bendable portion 1f when viewing from the outside in the vehicle width direction.

Figure 8:
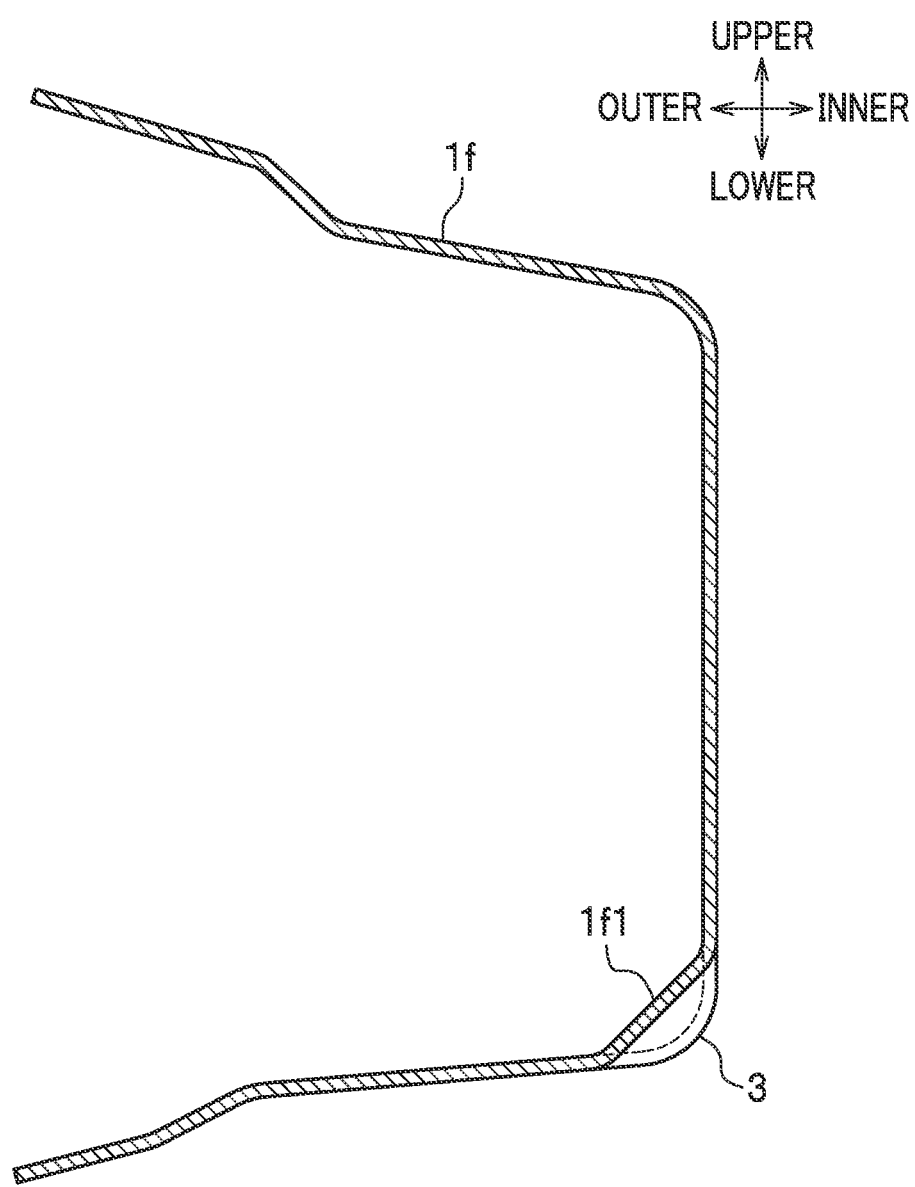
FIG. 8 is a sectional view taken along the line VIII-VIII of FIG. 7.

As seen in FIG. 7, a rear end of the first bendable portion 1f serves as the boundary with a stiffener 2 that is joined on a bottom surface of the front downwardly inclined portion 1b. A recess portion 1f1 is provided on a ridge line 3 of the rectangular cross-section of the first bendable portion 1f located in proximity to this boundary. In other words, as seen in FIG. 8 that shows a cross-sectional configuration taken along the line VIII-VIII of FIG. 7, the recess portion 1f1 that is recessed laterally outward from inward in the vehicle width direction is formed on the rear end side of the ridge line 3 of the rectangular cross-section extending in the longitudinal direction of the first bendable portion 1f.

The recess portion 1f1 forms a first starting point portion defined in the claims. The first starting point portion may be a groove or a notch. Other than the recess portion 1f1, the groove, and the notch as described above, the first starting point portion may have any shape as long as it triggers a bending deformation of the ridge line 3 of the rectangular cross-section in a frontal collision of the vehicle body.

Figure 9:
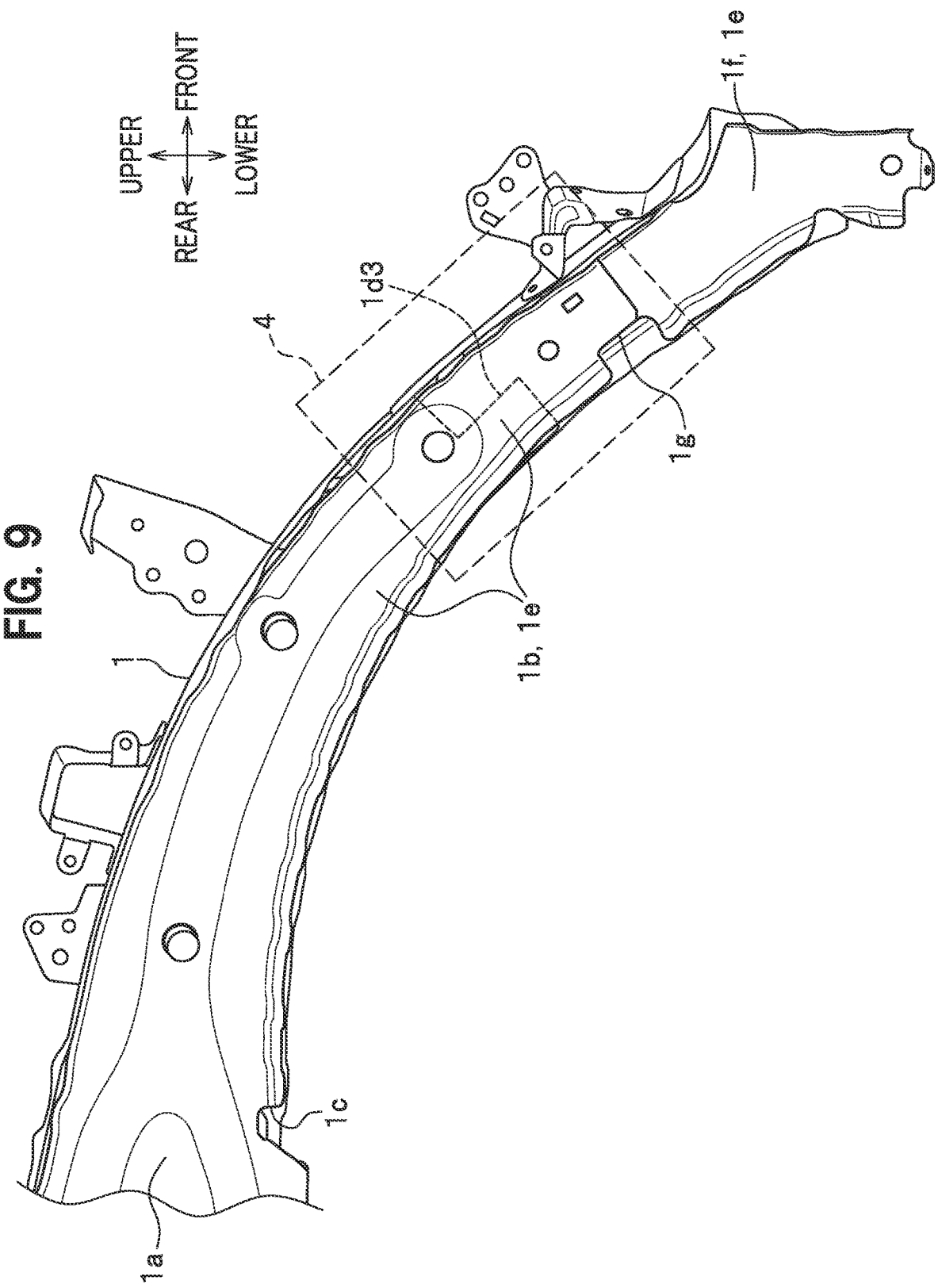
FIG. 9 is a side view showing the second bendable portion of the side frame.

As seen in FIG. 9, a second bendable portion 1g is provided longitudinally rearward of the first bendable portion 1f. The second bendable portion 1g is formed by cutting away a vertically lower side of the lid member 1e in a rectangular shape, so that the strength of the second bendable portion 1g is lowered to cause the side frame 1 to easily bend downward.

Figure 10:
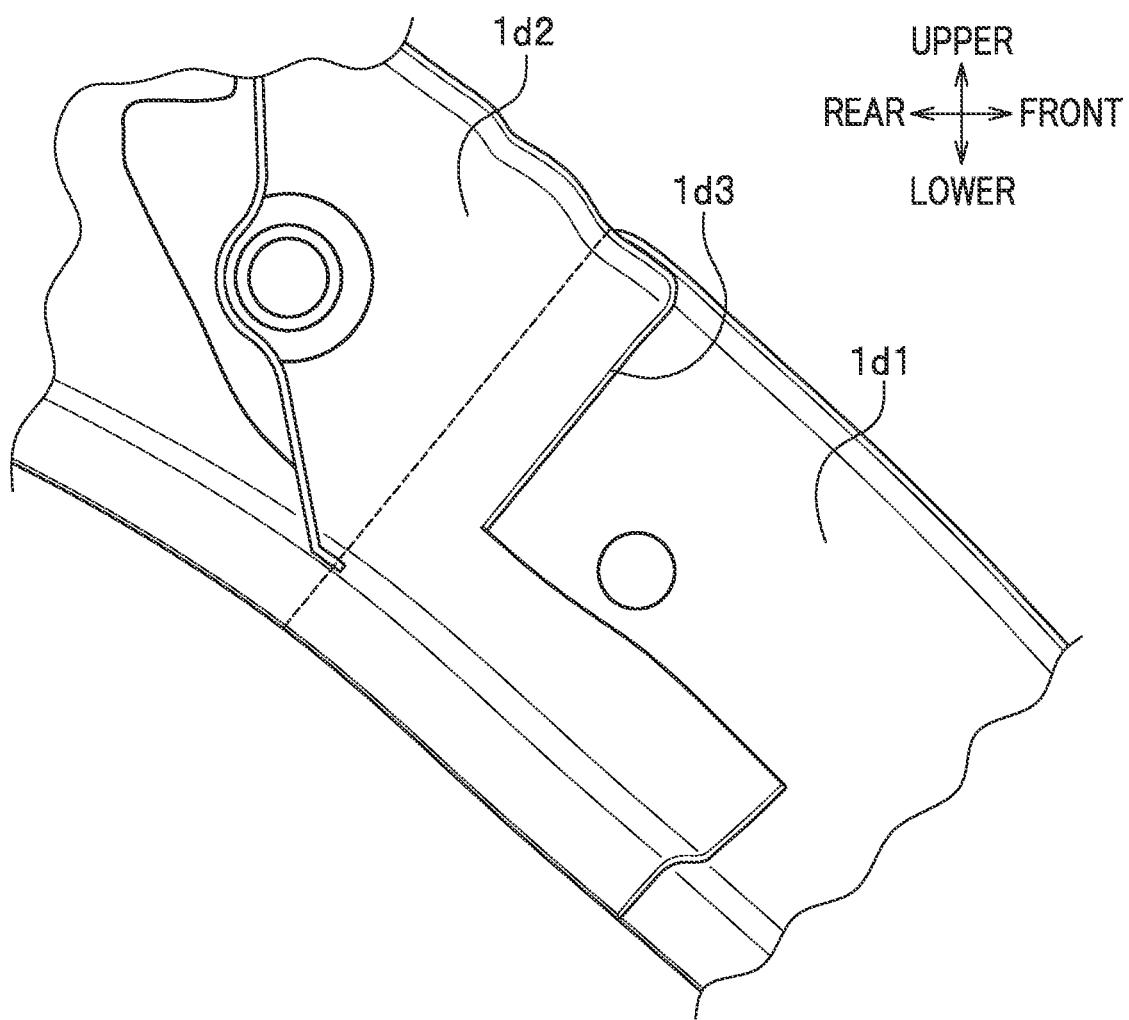
FIG. 10 is an enlarged view of a portion shown by the broken line of FIG. 9 with the lid member and the stiffener being removed.

FIG. 10 is an enlarged view of a portion shown by the broken line 4 of FIG. 9 with the lid member 1e being removed. As seen in FIG. 10, a front member 1d1 having a thick thickness and a rear member 1d2 having a thin thickness are provided rearward of the first bendable portion 1f (see FIG. 9). The front member 1d1 and the rear member 1d2 are joined by an L-shaped joint portion 1d3. To be more specific, a lower side of the rear member 1d2 having a thin thickness is extended frontward to be formed into an L-shape, and is brought into contact with a rear portion of the front member 1d1 having a thick thickness. The lower side of the rear member 1d2 and the rear portion of the front member 1d1 are assembled and joined together. This joint portion is referred to as an L-shaped joint portion 1d3.

It should be noted that a deformation energy in a frontal collision of the vehicle body can be increased at the front side of the rear member 1d2 having a thin thickness and thus easily deforms downward, so that the amount of energy absorption in a frontal collision of the vehicle body can be increased. Accordingly, the peak value of a load generated in the frontal collision of the vehicle body can be suppressed. However, according to the conventional joint between a straight end portion of a front member having a thick thickness and a straight end portion of a rear member having a thin thickness, a stress concentrates on the rear member having a thin thickness in a frontal collision of the vehicle, so that the rear member may be disadvantageously separated from the front member. Once the rear member is separated from the front member, the second bendable portion 1g located frontward of this separating point and the third bendable portion 2a located rearward of this separating point cannot be supported, so that the side frame 1 cannot be caused to deform downward properly.

According to this embodiment, the lower side of the front end portion of the rear member 1d2 having a thin thickness is extended frontward to form the L-shaped joint portion 1d3, and the straight end portion of the front member 1d1 having a thick thickness is joined with the L-shaped joint portion 1d3. With this configuration, since the L-shaped joint portion 1d3 reinforces and supports a lower side of the joint portion at which the thick front member 1d1 and the thin rear member 1d2 are joined together, a stress concentration is suppressed and a separation at the joint portion can be eliminated. Accordingly, the side frame 1 can be caused to deform properly at the second bendable portion 1g that is located frontward of the joint portion and at the third bendable portion 2a that is located rearward of the joint portion. In other words, as shown by the opposite arrows Y2 in FIG. 6, the second bendable portion 1g and the third bendable portion 2a bends over and deforms downward.

Figure 11:
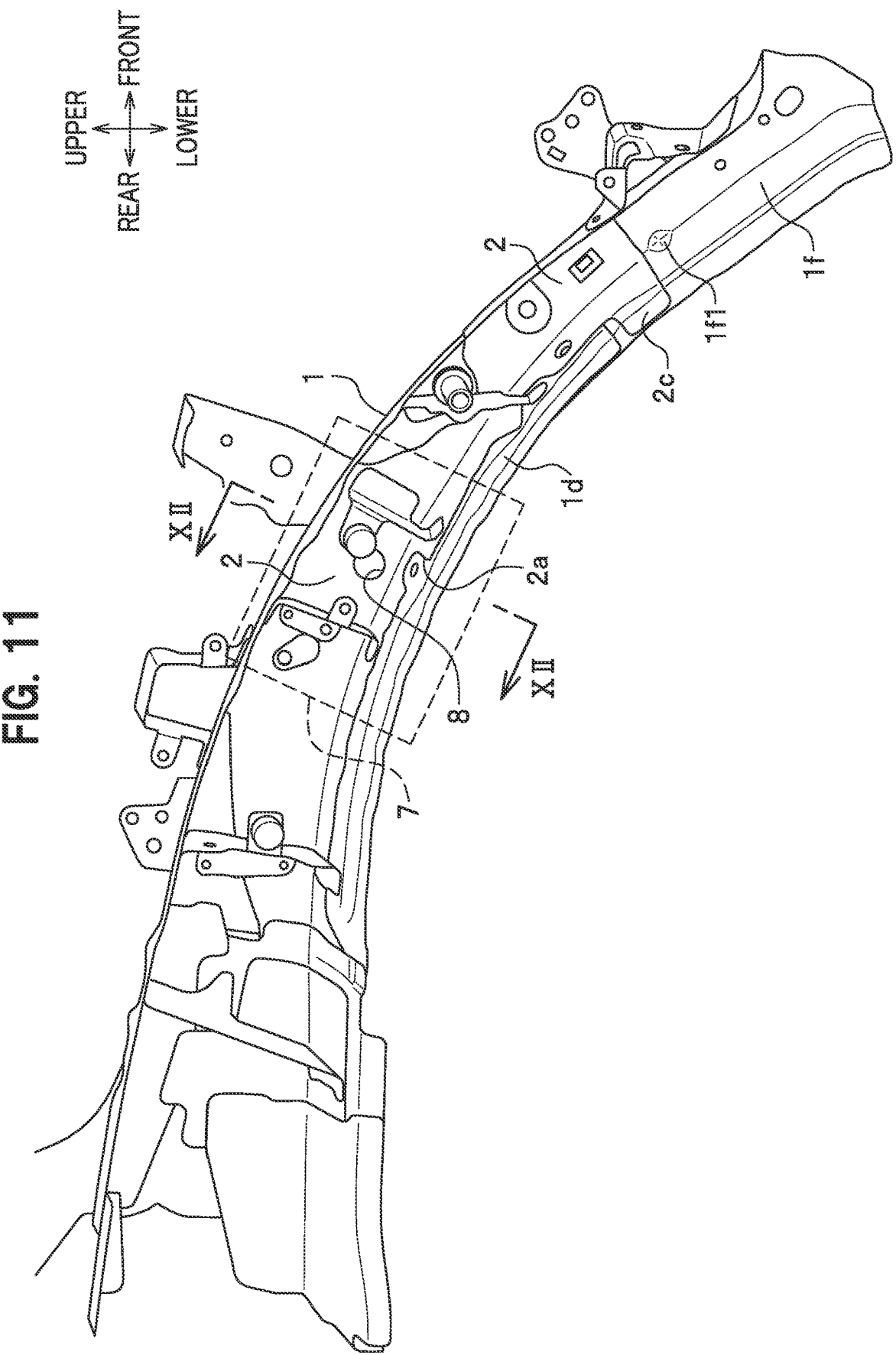
FIG. 11 is a side view of the side frame, when viewing from the laterally outer side in the vehicle width direction, with the lid member being removed.
Figure 12:
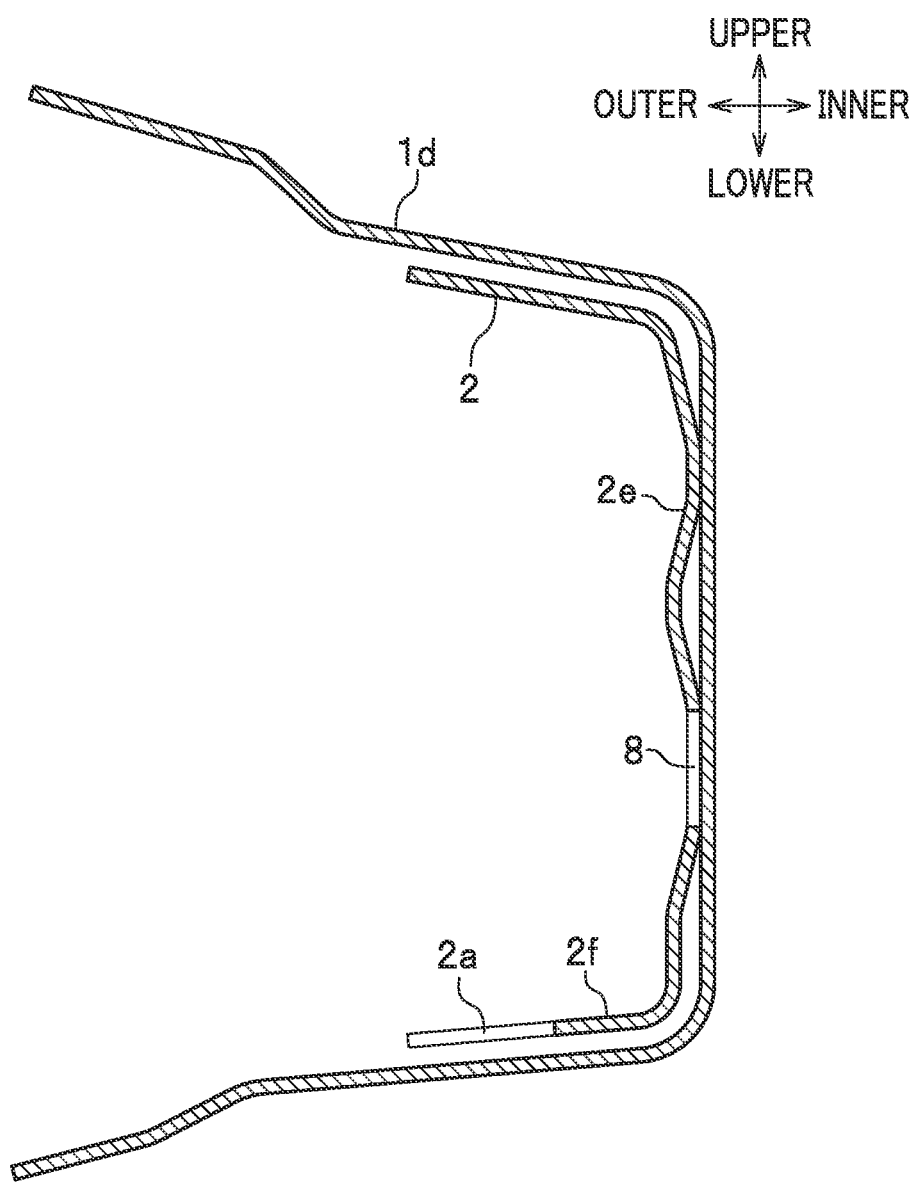
FIG. 12 is a sectional view taken along the line XII-XII of FIG. 11.

FIG. 11 is a side view of the side frame 1, when viewing from the laterally outer side in the vehicle width direction, with the lid member 1e being removed. A rear end portion of the recess portion 1f1 at the first bendable portion 1f of the side frame 1 overlaps with and is connected to the front end of the stiffener 2. The stiffener 2 extends to the rear end of the side frame 1. As seen in FIG. 12 illustrating a cross-sectional configuration taken along the line XII-XII of FIG. 11, the stiffener 2 has a U-shaped configuration and is fitted into an inner side of the U-shaped member 1d.

As seen in FIG. 12, a lower wall 2f disposed on the lower side of the stiffener 2 that is fitted into the U-shaped member 1d has a notch 2a (see FIG. 11) formed by cutting away the lower wall 2f in a rectangular shape. The notch 2a serves as the third bendable portion 2a. The notch 2a is formed in a position spaced apart rearward by a predetermined length from the front end of the stiffener 2 located at the boundary with the first bendable portion 1f. Formed in the side wall 2e of the stiffener 2 is a cutout 8 (see FIG. 20).

Providing at least the notch 2a in the stiffener 2 makes it possible to allow a bending deformation of the side frame 1 in a frontal collision of the vehicle body from the first bendable portion 1f at the front side of the vehicle body, the second bendable portion 1g (see FIG. 9), and the third bendable portion 2a in this order. In other words, the side frame 1 collapses while undergoing a multistage deformation by a large force received from the front side toward the rear side of the vehicle body.

Figure 13:
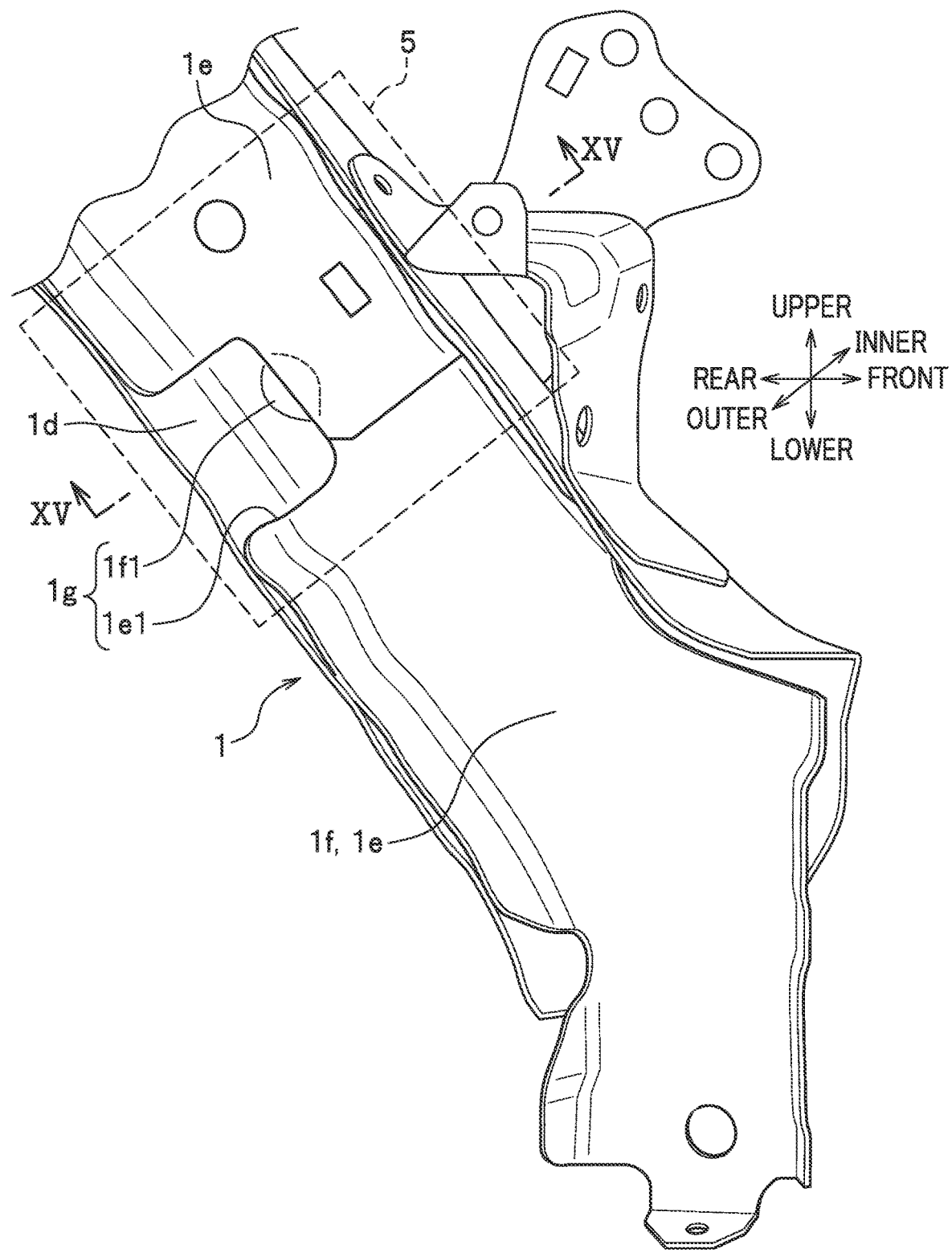
FIG. 13 is a side view showing the first bendable portion and the recess portion provided rearward of the first bendable portion at a front side of the side frame.
Figure 14:
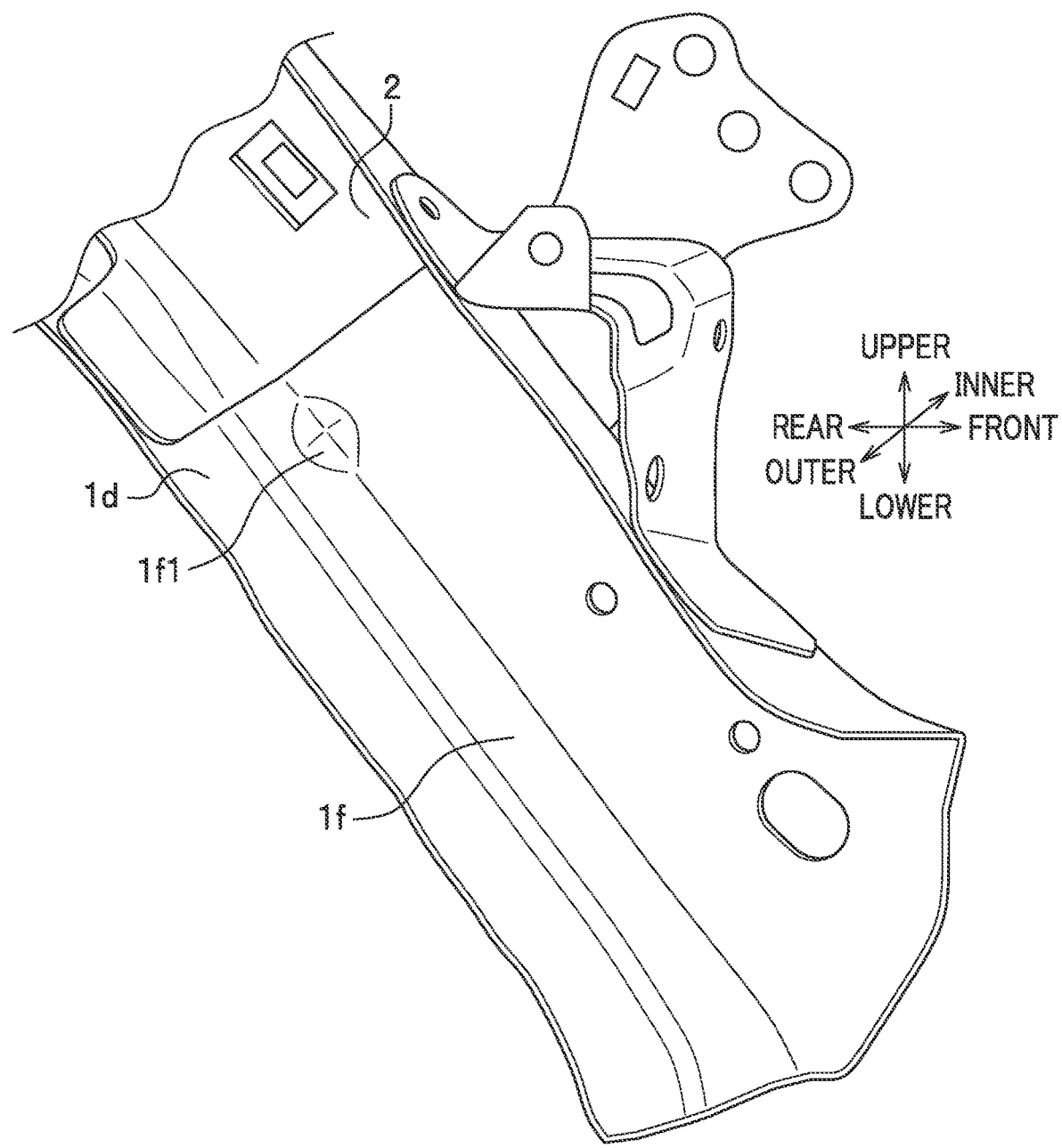
FIG. 14 is a side view showing a state in which a front end of the stiffener overlaps a rear end portion of the recess portion of the first bendable portion at the front side of the side frame.

As seen in FIG. 13, provided in the lid member 1e of the side frame 1 at a position laterally outside in the vehicle width direction from the recess portion 1f1 of the first bendable portion 1f is a starting point portion 1e1 formed by cutting away the lid member 1e in a rectangular shape. FIG. 14 shows a state with the lid member 1e being removed. FIG. 14 is a side view showing a state in which the front end of the stiffener 2 overlaps the rear end portion of the recess portion 1f1 of the first bendable portion 1f.

Figure 15:
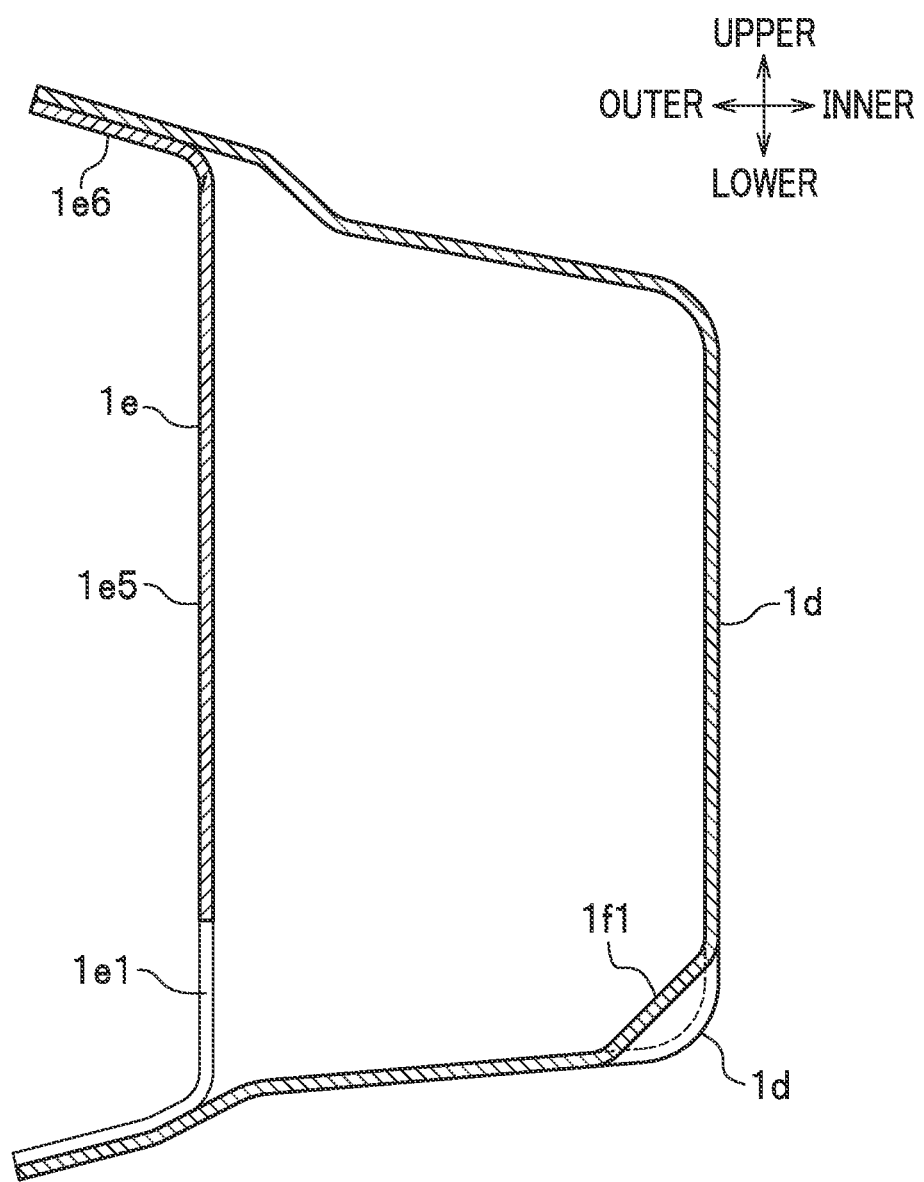
FIG. 15 is a sectional view taken along the line XV-XV of FIG. 13.

Further, the cross-sectional configuration taken along the line XV-XV of FIG. 13 is shown in FIG. 15. As seen in FIG. 15, the lid member 1e for covering the U-shaped member 1d has a starting point portion 1e1 formed by cutting away the lid member 1e. The starting point portion 1e1 is formed in a position laterally outside the recess portion 1f1 (first starting point portion) in the vehicle width direction.

The starting point portion 1e1 is not limited to the notch, and may be a groove or a recess portion. Other than the notch, the groove, and the recess portion as described above, any fragile portion may be employed as long as it triggers a bending deformation of the side frame 1 in a frontal collision of the vehicle body. The starting point portion 1e1 serves as the second starting point portion defined in the claims.

According to the side frame 1 configured as described above, since the starting point portion 1e1 is formed in the lid member 1e disposed laterally outside the U-shaped member 1d in the vehicle width direction and having a lower strength, the strength of the side frame 1 is lowered. Further, since the recess portion 1f1 and the starting point portion 1e1 are arranged spaced apart in the vehicle width direction of the side frame 1, it is possible to provide a structure that is more easily bendable in a frontal collision of the vehicle body.

Figure 16:
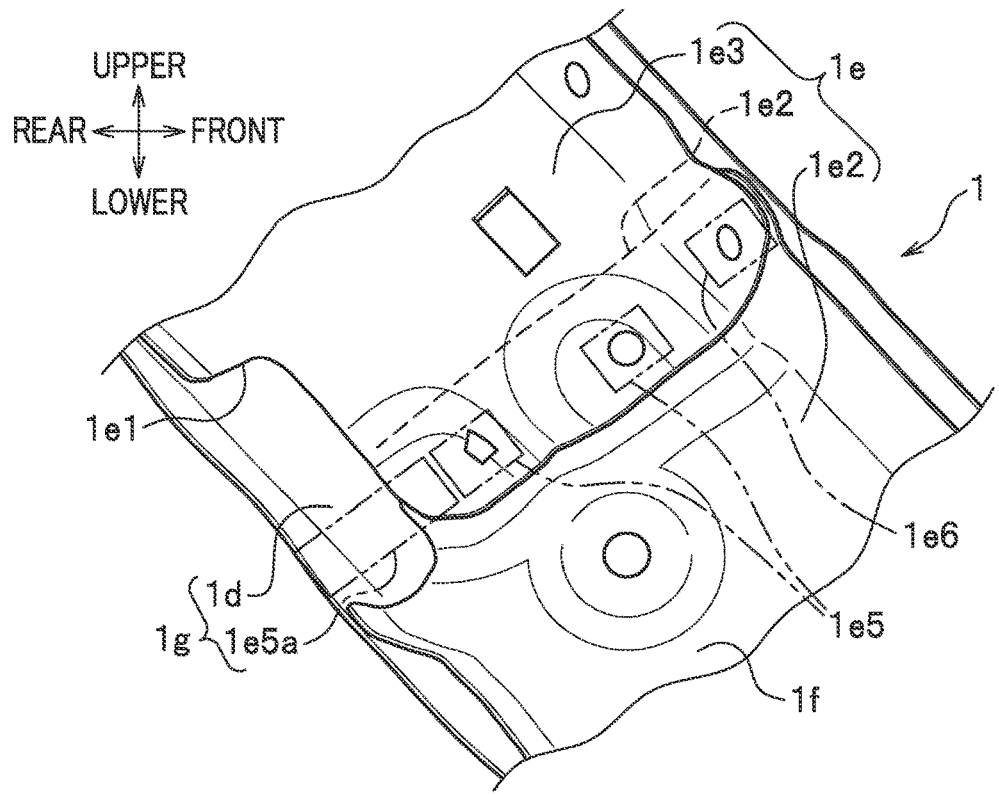
FIG. 16 is an enlarged side view of a portion 5 of the side frame shown by the broken line of FIG. 13.

FIG. 16 is an enlarged side view of a portion 5 of the side frame shown by the broken line of FIG. 13. As seen in FIG. 16, a front lid portion 1e2 is provided at the first bendable portion 1f, and a rear lid portion 1e3 is provided at a position rearward of the first bendable portion 1f. A front portion of the rear lid portion 1e3 is placed to overlap over a rear portion of the front lid portion 1e2 by a predetermined width, and the overlapping portion between the rear portion and the front portion are joined together as shown by the reference numerals 1e5 and 1e6.

These joint portions are referred to as lid joint portions 1e5, 1e6. As seen in FIG. 15, the lid joint portion 1e5 is a portion of the lid member 1e, at which a side surface of the front lid portion 1e2 and a side surface of the rear lid portion 1e3 are joined together, and the lid joint portion 1e6 is a portion of the lid member 1e, at which an upper surface of the front lid portion 1e2 and an upper surface of the rear lid portion 1e3 are joined together.

Referring back to FIG. 16, the lid joint portion 1e5 between the side surfaces is partly cut away in a rectangular shape to form the starting point portion 1e1. A part of the U-shaped member 1d is exposed to view through the rectangular-shaped starting point portion 1e1. Further, since the lid joint portions 1e5, 1e6 are formed of the side surface and the upper surface (see FIG. 15), a higher rigidity can be provided. Since the starting point portion 1e1 is formed by cutting away a portion 1e5a of the lid joint portion 1e5 at the side surfaces, the difference in rigidity between the starting point portion 1e1 and the lid joint portion 1e5 is large. For this reason, the closed cross-section of the second bendable portion 1g that is illustrated by the opposite arrows Y2 in FIG. 6 can bend over rearward and thus collapse easily.

Figure 17:
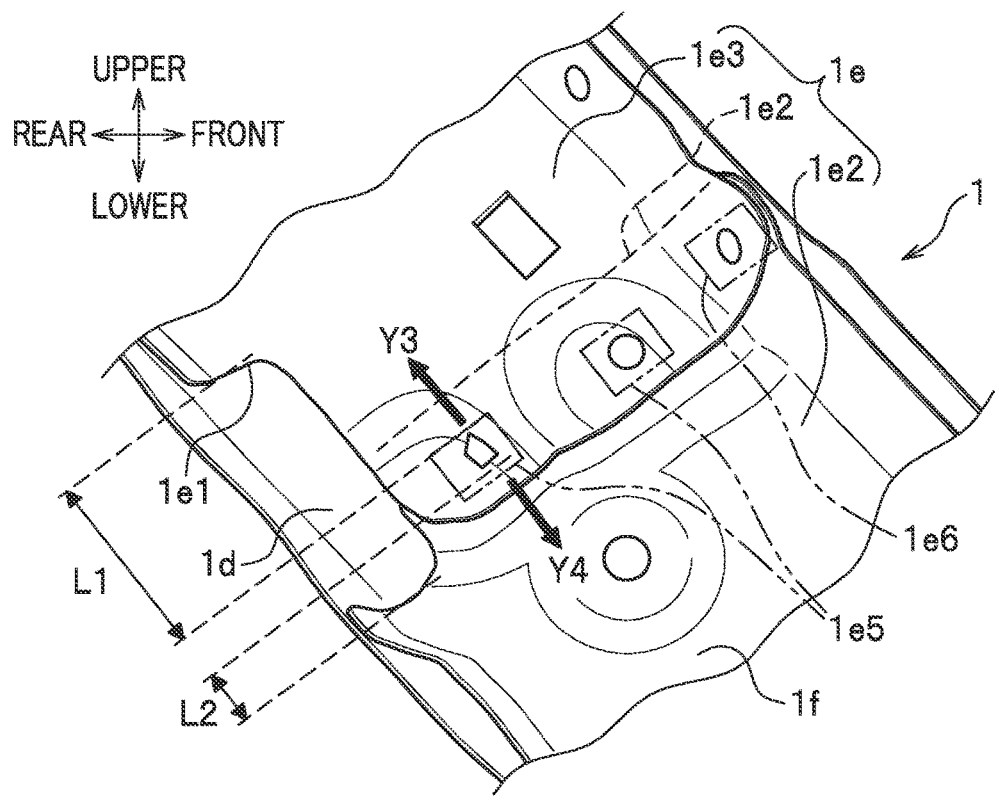
FIG. 17 is similar to FIG. 16, indicating dimensions at a starting point portion.

Further, as seen in FIG. 17, the starting point portion 1e1 of the side frame 1 has an extended length from the lid joint portion 1e5 in the longitudinal direction of the vehicle toward the rear side (as shown by the arrow Y3) and toward the front side (as shown by the arrow Y4). The starting point portion 1e1 is formed such that the extended length L1 at the rear side is longer than the extended length L2 at the front side.

Since the extended length L1 at the rear side is longer than the extended length L2 at the front side, the rigidity of the closed cross-section at the rear side of the starting point portion 1e1 is lower than the rigidity of the closed cross-section at the front side of the starting point portion 1e1. In other words, as compared with the front side of the lid joint portions 1e5, 1e6 having a higher rigidity, the closed cross-section at the rear side has a lower rigidity, so that the closed cross-section at the rear side can be crushed completely by the impact energy generated in the frontal collision of the vehicle body.

Figure 18:
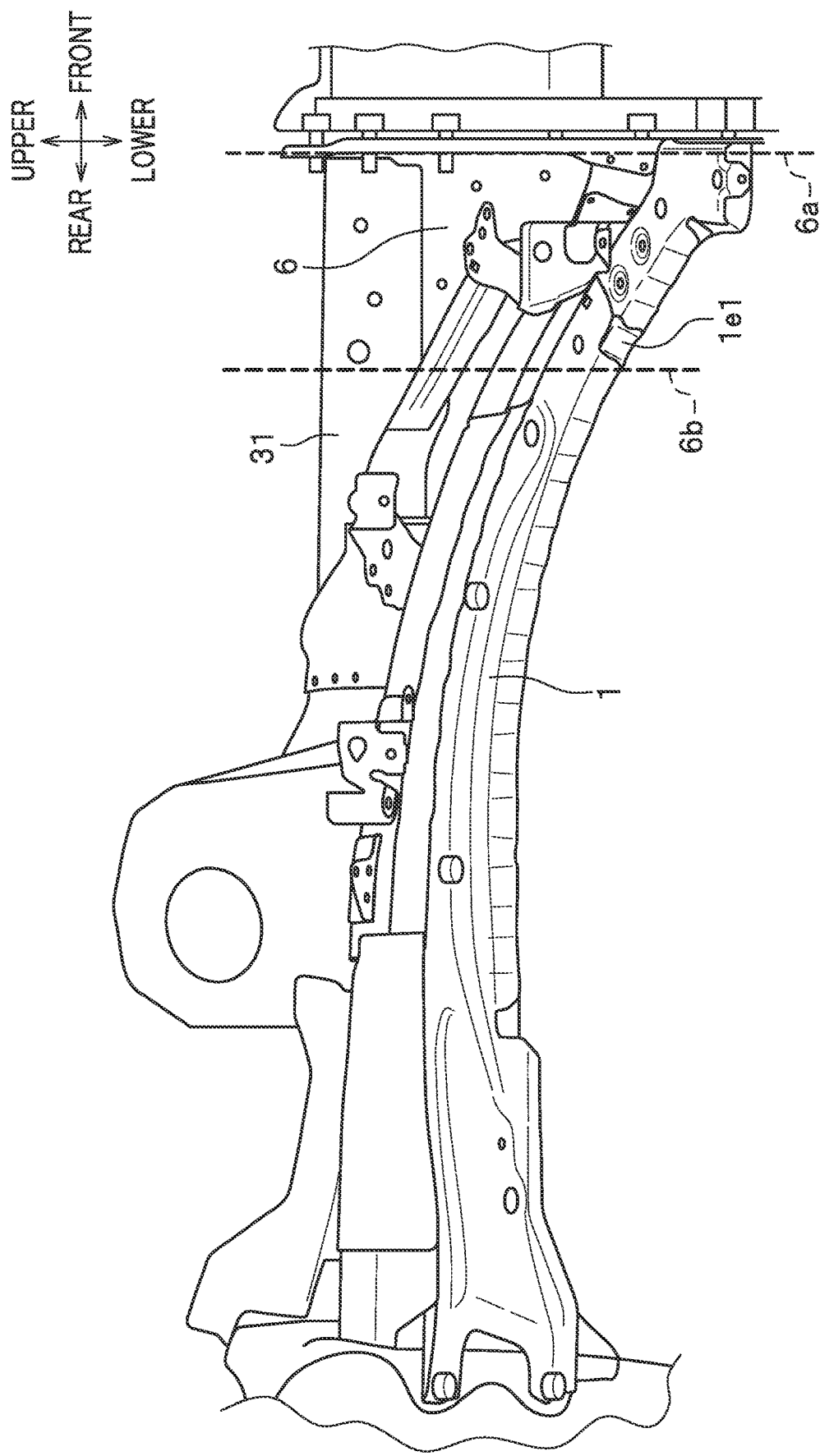
FIG. 18 is a perspective view showing the lateral frame disposed between the front end portion of the side frame and the front end portion of the front side frame.

Further, as seen from diagonally above in FIG. 18, a lateral frame (lateral cross member) 6 is connected between the front end portion of the side frame 1 and the front end portion of the front side frame 31. As seen in the plan view of FIG. 2, the lateral frame 6 has a slanted shape 6c such that a rear end side thereof is slanted toward rearward in the longitudinal direction of the vehicle as it extends laterally inward in the vehicle width direction from the side frame 1.

Further, the lateral frame 6 has a front end (front end 6a of the lateral frame 6) located in the position indicated by the broken line 6a in FIG. 18, and a rear end (rear end 6b of the lateral frame 6) located in the position indicated by the broken line 6b in FIG. 18. The fragile starting point portion 1e1 as described above is provided between the front end 6a and the rear end 6b of the lateral frame 6.

Since the starting point portion 1e1 is provided between the front end 6a and the rear end 6b of the lateral frame 6, the side frame 1 can easily undergo a bending deformation with the fragile starting point portion 1e1 serving as a starting point while the side frame 1 is securely supported by the front side frame 31 and the lateral frame 6.

Figure 19:
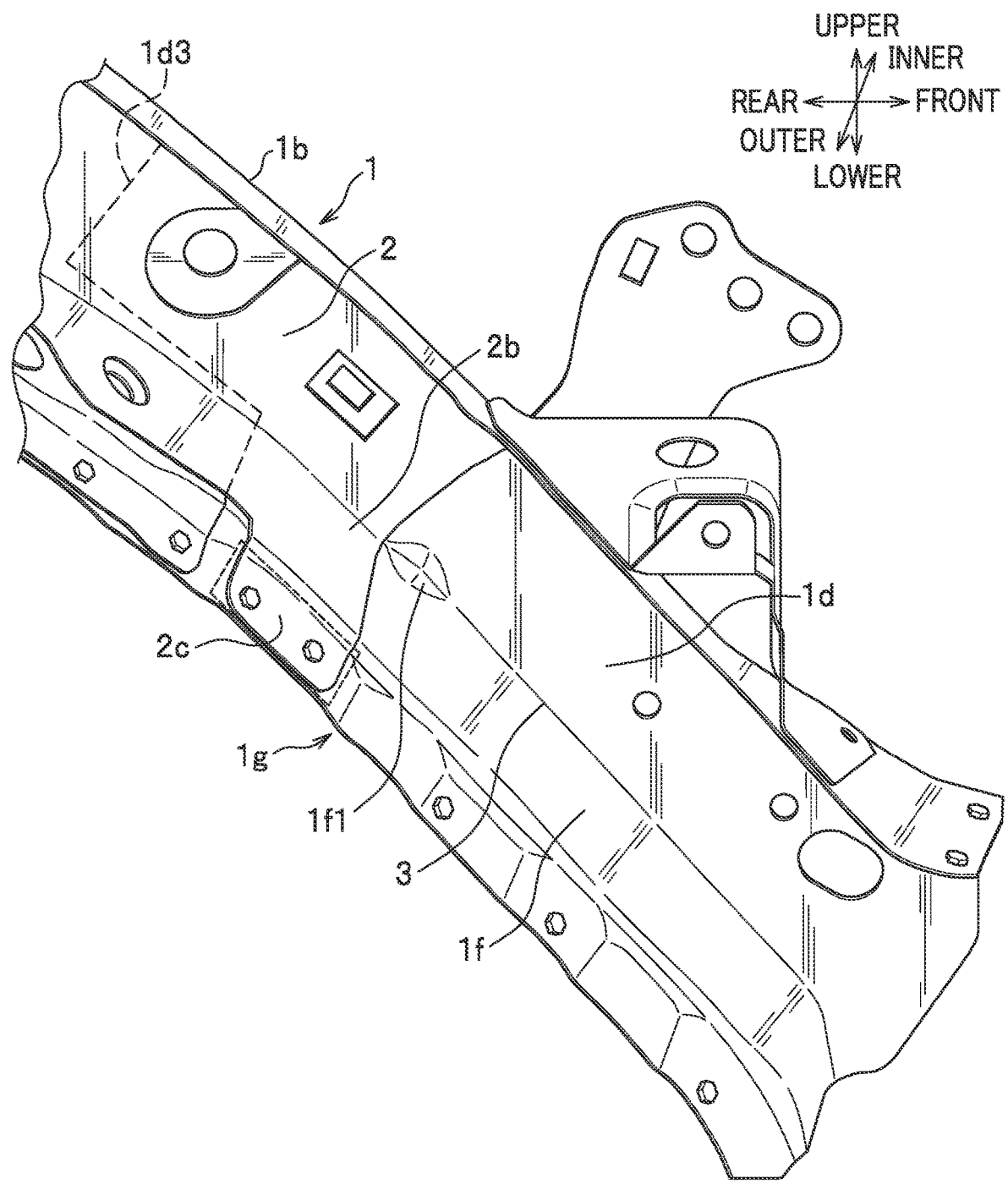
FIG. 19 is a side view showing a reinforcement plate provided to cover the second bendable portion of the side frame.

Further, as seen in FIG. 19, a reinforcement plate 2c (surrounded by the broken line) is provided. The reinforcement plate 2c is configured to reinforce a portion rearward of the starting point portion 1e1 (see FIG. 13) of the second bendable portion 1g (see FIG. 9) of the side frame 1. The reinforcement plate 2c is formed by extending the front end portion of the stiffener 2 downward at a predetermined width. The reinforcement plate 2c is connected to the side surface of the U-shaped member 1d to cover the starting point portion 1e1.

According to this embodiment, the reinforcement plate 2c is integrally formed with the stiffener 2 by the stiffener 2 extending laterally outward in the vehicle width direction.

However, the reinforcement plate 2c may be formed of a separate member different from the stiffener 2.

As described above, since the rear portion behind the second bendable portion 1g is reinforced by the reinforcement plate 2c, the second bendable portion 1g having a lower strength is likely to bend. Accordingly, the second bendable portion 1g is likely to bend in a frontal collision of the vehicle body.

Further, as seen in FIG. 19, the reinforcement plate 2c is integral with (or connected to) the stiffener 2, and is adjacent to the rear end of the starting point portion 1e1 (see FIG. 13) formed in the shape of a rectangular-shaped cutout. Since the reinforcement plate 2c connected to the stiffener 2 is adjacent to the rear end of the starting point portion 1e1, the second bendable portion 1g including the recess portion 1f1 is more likely to bend in a frontal collision of the vehicle body.

Figure 20:
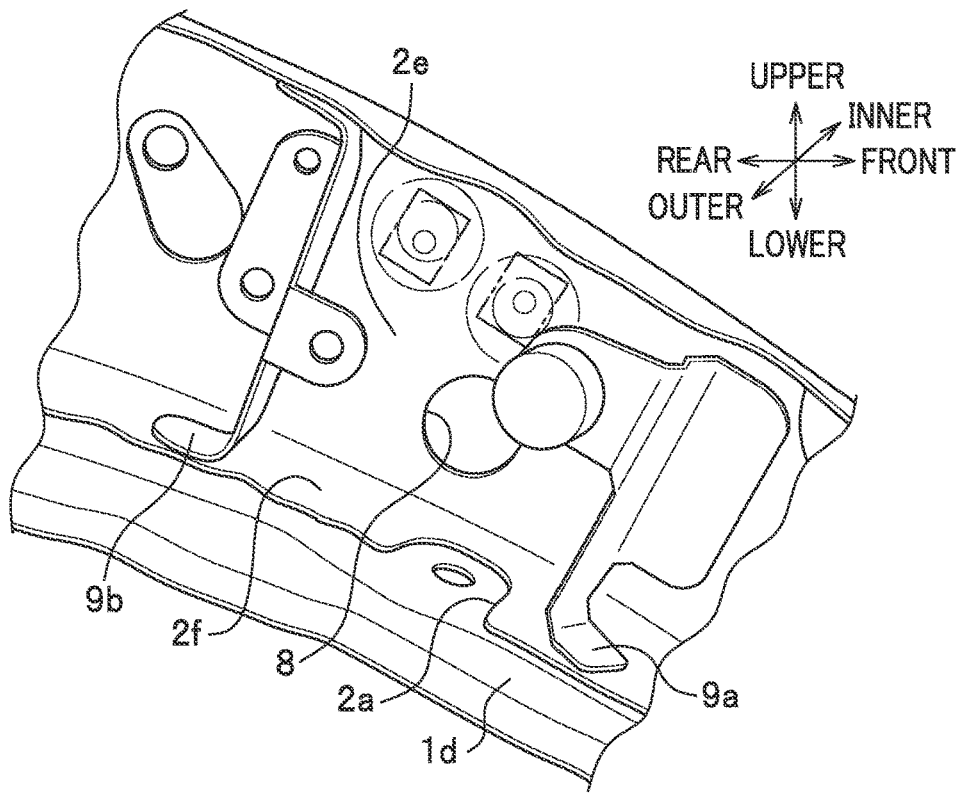
FIG. 20 is a side view showing support members disposed on the side frame, between which a notch and a cutout are disposed.

FIG. 20 is an enlarged view of a portion 7 shown by the broken line of FIG. 11. As seen in FIG. 20, a cutout 8 is formed in and extends through the side wall 2e at a position laterally inside the notch 2a (third bendable portion 2a) formed in the lower wall 2f of the stiffener 2 (see FIG. 12) that is disposed inside the U-shaped member 1d.

In other words, the cutout 8 and the notch 2a are provided spaced apart on a line having a predetermined width and extending in the vehicle width direction of the side frame 1. For this reason, the side frame 1 easily undergoes a bending deformation from the notch 2a to the cutout 8 in a frontal collision of the vehicle body, so that the closed cross-section at this position can collapse easily.

Further, the side wall 2e is connected to the U-shaped member 1d at a plurality of connecting points located above the cutout 8, and the cutout 8 for allowing a deformation of the stiffener 2 is formed between the notch 2a and the plurality of connecting points, so that the closed cross-section can collapse without fail. Further, even if the weight of the U-shaped member 1d is lightened by reducing the thickness of the U-shaped member 1d, the same or similar effect can be obtained by virtue of the plurality of connecting points as compared with the U-shaped member 1d having the normal thickness.

Further, as seen in FIG. 20, a pair of front and rear support members 9a, 9b are provided on the side frame 1 along the longitudinal direction of the vehicle, between which the notch 2a and the cutout 8 are disposed. The support members 9a, 9b are formed of a plurality of bulkheads extending in the vertical direction of the side frame 1 and having a predetermined length in the vehicle width direction.

Figure 21:
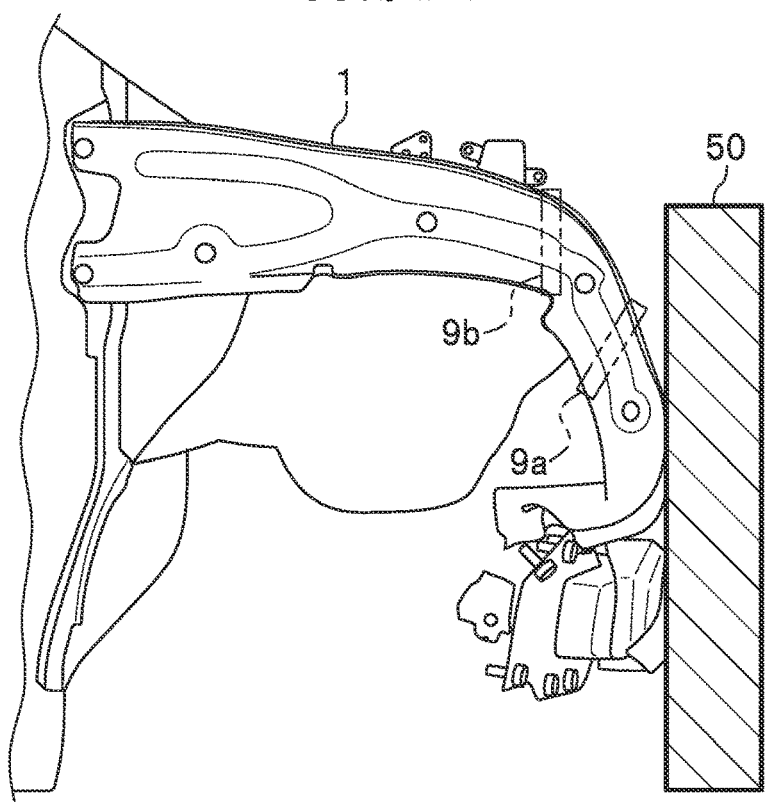
FIG. 21 is a side view illustrating a state in which front and rear sides of the notch and the cutout are supported by the support members when the side frame undergoes a bending deformation in a frontal collision of the vehicle body.

As seen in FIG. 21, the front side and the rear side of the notch 2a and the cutout 8 (see FIG. 20) are supported by the support members 9a, 9b. With this configuration, when the vehicle collides head on with the impacting object 50, as seen in FIG. 21, the closed cross-section can collapse easily from the notch 2a and the cutout 8 that are lower in strength, so that the side frame 1 can easily undergo a bending deformation.

As seen in FIG. 1, a groove (referred to as a groove 1c) serving as a fourth bendable portion 1c is formed in the side frame 1. The groove 1c opens downward and is provided in a position corresponding to the bent portion 1c disposed on the horizontal extension portion 1a of the side frame 1. To be more specific, the groove 1c extends in the vehicle width direction of the horizontal extension portion 1a and is recessed upward to open downward. The groove 1c serves as the fourth bendable portion 1c provided longitudinally rearward of the third bendable portion 2a in the longitudinal direction of the vehicle.

<Advantageous Effects of Vehicle Body Front Structure>

The characteristic configuration and advantageous effects of the vehicle body front structure according to the above-described embodiment will be described below.

The vehicle body front structure 100 includes the front side frame 31 extending in the longitudinal direction of the vehicle body, the side frame 1 disposed laterally outside the front side frame 31 in the vehicle width direction and extending in the longitudinal direction of the vehicle body, and the damper housing 43 disposed laterally inside the side frame 1 in the vehicle width direction. The characteristic configuration of this vehicle body front structure 100 will be described.

(1) The side frame extends obliquely in the frontward and downward direction from the bent portion 1*c* formed in proximity to the damper housing 43, and has a rectangular cross section formed by the U-shaped member 1*d* having a generally U-shaped cross-section and the lid member 1*e* disposed on the open side of the U-shaped member 1*d*. Further, the first bendable portion 1*f* is formed at the front end portion of the side frame 1 by setting the strength of the lid member 1*e* lower than the strength of the U-shaped member 1*d*.

Figure 6:
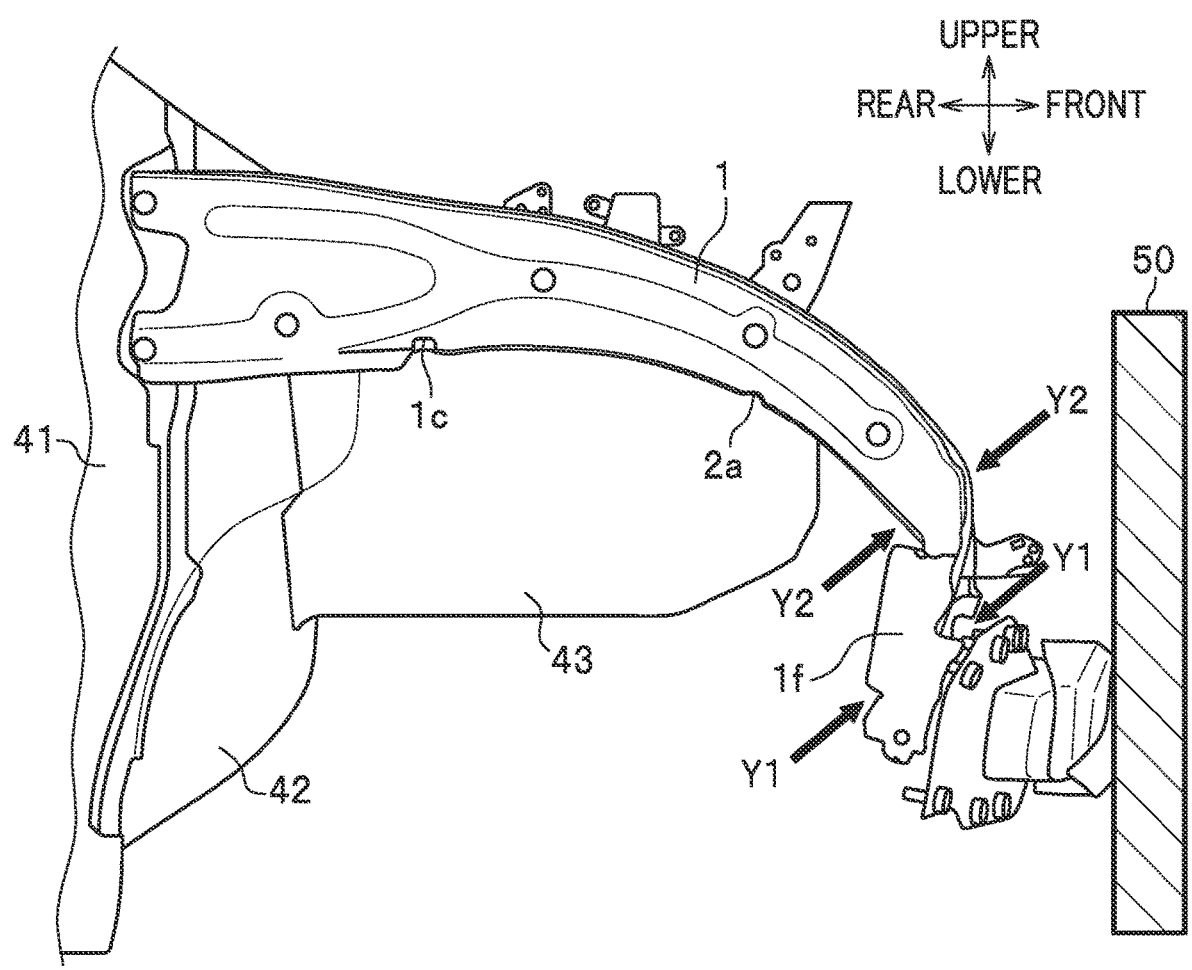
FIG. 6 is a side view showing the side frame having bent due to a frontal collision of a vehicle body.

According to this configuration, when the front end of the side frame 1 as shown in FIG. 1 collides with an impacting object 50 (see FIG. 6), the collision load acts on the first bendable portion 1*f*. In other words, the lid member 1*e* (see FIG. 5) having a lower strength buckles first when the load acts on the rectangular cross-section of the first bendable portion 1*f*, and the upper and lower sides of the U-shaped member 1*d* collapse to approach each other by this buckling. This collapse of the rectangular cross-section causes the first bendable portion 1*f* to undergo a bending deformation. Since the first bendable portion 1*f* is located frontward of the bent portion 1*c* in the longitudinal direction of the side frame 1, as seen in FIG. 6, this bending deformation occurs at the first bendable portion 1*f* early in the collision, and then the second bendable portion 1*g* located rearward of the first bendable portion 1*f* undergoes a bending deformation.

As described above, since the first bendable portion 1*f* bends to absorb the impact energy in the collision and the bending deformation of the bent portion 1*c* further absorbs the impact energy, the amount of the impact energy absorbed by the vehicle body can be further increased.

(2) The recess portion 1*f*1 serving as the first starting point portion is provided on the ridge line 3 of the rectangular cross-section located at the longitudinal rear end side of the first bendable portion 1*f*, wherein the first starting point portion serves as a starting point at which the side frame 1 starts to bend.

According to this configuration, since the recess portion 1*f*1 is disposed on the ridge line 3 of the rectangular cross-section at the rear portion of the first bendable portion 1*f*, the recess portion 1*f*1 can assist collapsing of the rectangular cross-section in a frontal collision. Accordingly, it is possible to efficiently absorb the impact energy.

(3) The U-shaped member 1*d* includes the rear member 1*d*2 having a thin thickness, and the front member 1*d*1 disposed frontward of the rear member 1*d*2 and having a thickness thicker than that of the rear member 1*d*2. The front end portion of the rear member 1*d*2 is formed to have a generally L-shaped configuration when viewing in the vehicle width direction. Further, at a position longitudinally rearward of the first bendable portion 1*f*, the lower side of the front end portion of the rear member 1*d*2 having a thin thickness is extended frontward to form the L-shaped joint portion 1*d*3, and the L-shaped joint portion 1*d*3 and the straight end portion of the front member 1*d*1 having a thick thickness are assembled and joined together, so that the second bendable portion 1*g*, at which the side frame 1 is likely to bend downward, is formed between the first bendable portion 1*f* and the L-shaped joint portion 1*d*3.

According to this configuration, since the straight end portion of the front member ldl having a thick thickness and the L-shaped joint portion 1*d*3 formed by extending frontward the lower side of the front end portion of the rear member 1*d*2 having a thin thickness reinforce and support the lower side of the joint portion at which the front member 1*d*1 and the rear member 1*d*2 are joined together, unlike the conventional configuration, a stress concentration on the rear member 1*d*2 in the frontal collision of the vehicle body can be suppressed and a separation at the joint portion can be eliminated. Accordingly, in the frontal collision of the vehicle, the side frame 1 can be caused to deform properly at the second bendable portion 1*g* that is located frontward of the joint portion, so that the impact energy can be absorbed further.

(4) The stiffener 2 extending in the longitudinal direction is disposed inside the rectangular cross-section of the side frame 1, and the third bendable portion 2*a* is provided on the side frame 1 by forming the notch 2*a* in the stiffener 2 at a position rearward of the first bendable portion 1*f*.

This configuration allows the side frame 1 to undergo a multistage deformation and collapse from the first bendable portion 1*f* at the front side of the vehicle body to the third bendable portion 2*a* in this order in the frontal collision of the vehicle body, so that the impact energy can be absorbed further.

(5) The starting point portion 1*e*1 (second starting point portion) serving as a starting point at which the side frame 1 starts to bend is provided on a portion of the lid member 1*e* that is located laterally outside the recess portion 1*f*1 (first starting point portion) of the side frame 1.

According to this configuration, the recess portion 1*f*1 and the starting point portion lel are arranged spaced apart in the vehicle width direction of the side frame 1. This can cause the second bendable portion 1*g* (see FIG. 13) to more easily bend and collapse in the frontal collision of the vehicle body, so that the impact energy can be absorbed further.

(6) The lid member 1*e* includes the rear lid portion 1*e*3 disposed on the rear side, and the front lid portion 1*e*2 disposed frontward of the rear lid portion 1*e*3, and the lid joint portions 1*e*5, 1*e*6 are formed rearward of the first bendable portion 1*f* by superposing and joining the front end portion of the rear lid portion 1*e*3 and the rear end portion of the front lid portion 1*e*2. The starting point portion 1*e*1 serving as the second starting point portion is formed by cutting the lid member 1*e* at a position overlapping the lid joint portions 1*e*5, 1*e*6 in the vertical direction.

According to this configuration, the front portion of the rear lid portion 1*e*3 is placed to overlap over the rear portion of the front lid portion 1*e*2 by a predetermined width, and the overlapping portion between the rear portion and the front portion are joined together to provide the lid joint portions 1*e*5, 1*e*6, so that the rigidity thereof can be increased. Since the starting point portion 1*e*1 is formed by cutting away a portion of the lid joint portions 1*e*5, 1*e*6 having higher rigidity, the difference in rigidity between the starting point portion 1*e*1 and the lid joint portions 1*e*5, 1*e*6 having higher rigidity is large, so that the closed cross-section at this starting point portion 1*e*1 can bend over rearward and thus collapse easily. Accordingly, the impact energy generated in the frontal collision of the vehicle body can be absorbed further.

(7) The starting point portion 1e1 serving as the second starting point portion has an extended length in the longitudinal direction of the vehicle body toward the rear side and toward the front side from the lid joint portions 1e5, 1e6 of the side frame 1, and the extended length is longer at the rear side than at the front side.

According to this configuration, since the starting point portion 1e1 is configured such that the extended length L1 at the rear side is longer than the extended length L2 at the front side, the rigidity of the closed cross-section at the rear side is lower than the rigidity of the closed cross-section at the front side. Accordingly, the closed cross-section at the rear side can be crushed completely by the impact energy generated in the frontal collision of the vehicle body.

(8) The lateral frame 6 is disposed between the front end portion of the side frame 1 and the front end portion of the front side frame 31, and the lateral frame 6 has a slanted shape such that the rear end side thereof is slanted toward rearward in the longitudinal direction of the vehicle body as it extends laterally inward in the vehicle width direction from the side frame 1. The starting point portion 1e1 is provided between the front end 6a and the rear end 6b of the lateral frame 6.

According to this configuration, since the starting point portion 1e1 is provided between the front end 6a and the rear end 6b of the lateral frame 6, the side frame 1 is securely supported by the front side frame 31 and the lateral frame 6. Accordingly, in the frontal collision of the vehicle body the side frame 1 can easily undergo a bending deformation with the fragile starting point portion 1e1 serving as a starting point, so that the impact energy can be absorbed further.

(9) The vehicle body front structure 100 includes the reinforcement plate 2c configured to reinforce a portion frontward of the L-shaped joint portion 1d3 and rearward of the second bendable portion 1g.

According to this configuration, since the reinforcement plate 2c reinforces a portion rearward of the second bendable portion 1g, the second bendable portion 1g is likely to bend. Accordingly, in the frontal collision of the vehicle body the second bendable portion 1g can easily undergo a bending deformation, so that the impact energy can be absorbed further.

(10) The stiffener 2 extending in the longitudinal direction is disposed inside the rectangular cross-section of the side frame 1, and the starting point portion 1e1 serving as the second starting point portion at which the side frame 1 starts to bend is provided on a portion of the lid member 1e that is located laterally outside the recess portion 1f1 serving as the first starting point portion of the side frame 1. The reinforcement plate 2c is connected to the stiffener 2 and is disposed adjacent to the rear end of the starting point portion 1e1.

According to this configuration, since the reinforcement plate 2c connected to the stiffener 2 is disposed adjacent to the rear end of the starting point portion 1e1, the second bendable portion 1g including the recess portion 1f1 and the starting point portion 1e1 can easily undergo a bending deformation, so that the impact energy can be absorbed further.

(11) The stiffener 2 includes the lower wall 2f and the side wall 2e disposed laterally inside the lower wall 2f in the vehicle width direction. The third bendable portion 2a is the notch 2a formed in the lower wall 2f, and the side wall 2e has the cutout 8 in the position corresponding to the third bendable portion 2a.

According to this configuration, the notch 2a and the cutout 8 are provided spaced apart on a line having a predetermined width and extending in the vehicle width direction of the side frame 1. For this reason, the side frame 1 easily undergoes a bending deformation from the notch 2a to the cutout 8 in the frontal collision of the vehicle body, so that the closed cross-section at this position can collapse easily and thus the impact energy can be absorbed further.

(12) A pair of front and rear support members 9a, 9b are disposed inside the rectangular cross-section of the side frame 1, and the notch 2a and the cutout 8 are disposed between the pair of front and rear support members 9a, 9b.

According to this configuration, since the front side and the rear side of the notch 2a and the cutout 8 are supported by the support members 9a, 9b, the closed cross-section can collapse easily from the notch 2a and the cutout 8 in the frontal collision of the vehicle body. Accordingly, the side frame 1 can easily undergo a bending deformation, so that the impact energy can be absorbed further.

(13) The groove that opens downward and serves as the fourth bendable portion 1c is formed in the position corresponding to the bent portion 1c on the lower surface of the side frame 1.

According to this configuration, the fourth bendable portion 1c is formed by the groove on the lower surface of the side frame 1. Accordingly, as seen in FIG. 1, the side frame 1 includes the first bendable portion 1f, the second bendable portion 1g, the third bendable portion 2a, and the fourth bendable portion 1c that are arranged spaced apart in this order from the front side toward the rear side of the side frame 1 along the longitudinal direction of the vehicle. This makes it possible to cause the side frame 1 to crush completely by four stages in the frontal collision of the vehicle body, so that the impact energy can be absorbed further.

Although the vehicle body front structure according to one embodiment of the present invention has been described above, the present invention is not limited to this specific configuration. It should be understood that various changes or modifications may be made where appropriate without departing from the gist of the present invention.

The invention claimed is:
1. A vehicle body front structure comprising:
a front side frame extending in a longitudinal direction of a vehicle body;
a side frame disposed laterally outside the front side frame in a vehicle width direction and extending in the longitudinal direction of the vehicle body; and
a damper housing disposed laterally inside the side frame in the vehicle width direction,
wherein the side frame extends obliquely in a frontward and downward direction from a bent portion formed in proximity to the damper housing, and has a rectangular cross-section formed by a U-shaped member having a generally U-shaped cross-section and a lid member disposed on an open side of the U-shaped member,
wherein a first bendable portion is formed at a front end portion of the side frame by setting a strength of the lid member lower than a strength of the U-shaped member,
wherein the U-shaped member includes a rear member having a thin thickness, and a front member disposed frontward of the rear member and having a thickness thicker than that of the rear member,
wherein a front end portion of the rear member is formed to have a generally L-shaped configuration when viewing in the vehicle width direction,
wherein a rear end portion of the front member is formed to have a generally U-shaped configuration when viewing in the vehicle width direction, wherein an L-shaped connecting portion is formed rearward of the first bendable portion by combining and joining the front end portion of the rear member and the rear end portion of the front member, and wherein a second bendable portion, at which the side frame is likely to bend downward, is formed between the first bendable portion and the L-shaped connecting portion.

2. The vehicle body front structure according to claim 1, wherein a first starting point portion is provided on a ridge line of the rectangular cross-section located at a longitudinal rear end side of the first bendable portion, the first starting point portion serving as a starting point at which the side frame starts to bend.

3. The vehicle body front structure according to claim 1, wherein a stiffener extending in the longitudinal direction is disposed inside the rectangular cross-section of the side frame, and wherein a third bendable portion is provided on the side frame by forming a notch in the stiffener at a position rearward of the first bendable portion.

4. The vehicle body front structure according to claim 2, wherein a second starting point portion is provided on a portion of the lid member that is located laterally outside a first starting point portion of the side frame, the second starting point portion serving as a starting point at which the side frame starts to bend.

5. The vehicle body front structure according to claim 4, wherein the lid member includes a rear lid portion disposed on a rear side, and a front lid portion disposed frontward of the rear lid portion, wherein a lid joint portion is formed rearward of the first bendable portion by superposing and joining a front end portion of the rear lid portion and a rear end portion of the front lid portion, and wherein the second starting point portion is a notch formed by cutting the lid member at a position overlapping the lid joint portion in an upper-lower direction.

6. The vehicle body front structure according to claim 5, wherein the second starting point portion has an extended length in the longitudinal direction of the vehicle body toward a rear side and toward a front side from the lid joint portion of the side frame, and an extended length is longer at the rear side than at the front side.

7. The vehicle body front structure according to claim 6, further comprising a lateral frame disposed between the front end portion of the side frame and a front end portion of the front side frame, the lateral frame having a slanted shape such that a rear end side thereof is slanted toward rearward in the longitudinal direction of the vehicle body as it extends laterally inward in the vehicle width direction from the side frame, and wherein the first starting point portion and the second starting point portion are provided between a front end and a rear end of the lateral frame.

8. The vehicle body front structure according to claim 1, further comprising a reinforcement plate configured to reinforce a portion frontward of the L-shaped connecting portion and rearward of the second bendable portion.

9. The vehicle body front structure according to claim 8, wherein a stiffener extending in the longitudinal direction is disposed inside the rectangular cross-section of the side frame, and wherein a second starting point portion is provided on a portion of the lid member that is located laterally outside a first starting point portion of the side frame, the second starting point portion serving as a starting point at which the side frame starts to bend, and wherein the reinforcement plate is connected to the stiffener and is disposed adjacent to a rear end of the second starting point portion.

10. The vehicle body front structure according to claim 3, wherein the stiffener includes a lower wall and a side wall disposed laterally inside the lower wall in the vehicle width direction, wherein the third bendable portion is a notch formed in the lower wall, and wherein the side wall has a cutout in a position corresponding to the third bendable portion.

11. The vehicle body front structure according to claim 10, wherein a pair of front and rear support members are disposed inside the rectangular cross-section of the side frame, and wherein the notch and the cutout are disposed between the pair of front and rear support members.

12. The vehicle body front structure according to claim 11, wherein a groove that opens downward and serves as a fourth bendable portion is formed in a position corresponding to the bent portion on a lower surface of the side frame.

* * * * *